(12) United States Patent
Frontera et al.

(10) Patent No.: US 10,744,562 B2
(45) Date of Patent: Aug. 18, 2020

(54) ADDITIVE MANUFACTURING EMPLOYING A PLURALITY OF ELECTRON BEAM SOURCES

(71) Applicant: GENERAL ELECTRIC COMPANY, Schenectady, NY (US)

(72) Inventors: Mark Alan Frontera, Ballston Lake, NY (US); Vasile Bogdan Neculaes, Niskayuna, NY (US); James William Sears, Niskayuna, NY (US); Peter Andras Zavodszky, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 764 days.

(21) Appl. No.: 15/005,430

(22) Filed: Jan. 25, 2016

(65) Prior Publication Data
US 2017/0210073 A1 Jul. 27, 2017

(51) Int. Cl.
*B22F 3/10* (2006.01)
*B22F 3/105* (2006.01)
*B33Y 30/00* (2015.01)
*B33Y 10/00* (2015.01)

(52) U.S. Cl.
CPC ............ *B22F 3/1055* (2013.01); *B33Y 30/00* (2014.12); *B22F 2003/1056* (2013.01); *B33Y 10/00* (2014.12); *Y02P 10/295* (2015.11)

(58) Field of Classification Search
CPC ............ B22F 3/1055; B22F 2003/1056; B22F 2003/1057; B33Y 30/00; B33Y 10/00; B33Y 50/00; B33Y 50/02; Y02P 10/295; H01J 2237/02; H01J 37/06; H01J 37/02
See application file for complete search history.

(56) References Cited

U.S. PATENT DOCUMENTS

| 6,143,378 | A | 11/2000 | Harwell et al. |
| 2011/0203937 | A1 | 8/2011 | Sidhu |
| 2013/0300286 | A1 | 11/2013 | Jungblad et al. |
| 2014/0163717 | A1* | 6/2014 | Das ...................... B22F 3/1055 700/119 |

(Continued)

FOREIGN PATENT DOCUMENTS

| CN | 204122756 U | 1/2015 |
| CN | 104759623 A | 7/2015 |

(Continued)

OTHER PUBLICATIONS

Kahnert, M. et al.,"Layer Formations in Electron Beam Sintering," Solid Freeform Fabrication Symposium Proceedings, pp. 88-99, (2007).

(Continued)

*Primary Examiner* — Joseph S Del Sole
*Assistant Examiner* — Jamel M Nelson
(74) *Attorney, Agent, or Firm* — Dority & Manning, P.A.

(57) ABSTRACT

Adaptively forming a three-dimensional component may include providing a plurality of electron beam sources, and simultaneously controlling the plurality of electron beam sources to direct a plurality of electron beams onto a plurality of deposited layers of metallic powder to sequentially consolidate patterned portions of the plurality of deposited metallic powder layers to adaptively form the three-dimensional component.

18 Claims, 3 Drawing Sheets

(56) References Cited

U.S. PATENT DOCUMENTS

| | | | |
|---|---|---|---|
| 2014/0246809 A1 | 9/2014 | Hofmann et al. | |
| 2014/0348691 A1* | 11/2014 | Ljungblad | B22F 3/1055 |
| | | | 419/53 |
| 2015/0054204 A1 | 2/2015 | Tseliakhovich et al. | |
| 2015/0165524 A1 | 6/2015 | Ljungblad et al. | |
| 2015/0165556 A1 | 6/2015 | Jones et al. | |
| 2015/0165683 A1 | 6/2015 | Cheverton et al. | |
| 2015/0177158 A1 | 6/2015 | Cheverton | |
| 2017/0066052 A1* | 3/2017 | Abe | B33Y 30/00 |

FOREIGN PATENT DOCUMENTS

| | | | |
|---|---|---|---|
| WO | 2013087515 A1 | 6/2013 | |
| WO | 2014199149 A1 | 12/2014 | |

OTHER PUBLICATIONS

Sames, W.J., "Additive Manufacturing of Inconel 718 Using Electron Beam Melting: Processing, Post-Processing, Post-Processing & Mechanical Properties", Dissertation Abstracts International, Nuclear Engineering, Copyright 2015 William James Sames V, pp. 1-339, (May 2015).

Extended European Search report and Opinion issued in connection with corresponding EP Application No. 17151903.6 dated May 23, 2017.

Zah, et al; "Modeling and simulation of electron beam melting," Production Engineering, vol. 4, Issue 1, pp. 15-23, Feb. 2010.

Hou, et al; "3D Printing of structures with embedded circuit boards using novel holographic optics," Electronic Components and Technology Conference (ECTC), 2013 IEEE 63rd, pp. 455-460, Las Vegas, Nevada, May 28-31, 2013.

\* cited by examiner

ADDITIVE MANUFACTURING EMPLOYING A PLURALITY OF ELECTRON BEAM SOURCES

TECHNICAL FIELD

The present disclosure relates generally to additive manufacturing, and more particularly, to additive manufacturing employing a plurality of electron beam sources.

BACKGROUND

Recently, additive manufacturing methods for making metal alloy components have emerged as alternatives to casting and machining methods. Additive manufacturing is also referred to as "layered manufacturing," "reverse machining," and "3-D printing." On a basic level, additive manufacturing technologies are based on the concept of building up material in a cross-sectional layer-by-layer to form a 3D component. Common to additive manufacturing technologies is the use of a 3D modeling software (Computer Aided Design or CAD), machine equipment, and layering material. Once a CAD sketch is produced, the machine equipment reads in data from the CAD file and adds successive layers of a desired material to fabricate the 3D component.

Some specific additive manufacturing processes employ a powder bed fusion technique to fuse metal alloy powder in additive steps to produce a component. For example, some additive manufacturing processes utilize a beam of energy that is scanned across a powder bed to fuse a layer of metal alloy powder in the powder bed in additive steps. Some examples of such powder bed additive manufacturing processes include direct metal laser sintering/fusion (DMLS)/(DMLF), selective laser sintering/fusion (SLS)/(SLF), and electron beam melting (EBM). In these processes, a layer of metal alloy powder in the powder bed is fused to an underlying partially-formed component (or a seed component) to add a new layer to the component. A new layer of metal alloy powder is deposited into the powder bed and over the previously formed layer of the partially-formed component, and the new layer of metal alloy powder is similarly fused to the component. The depositing-and-fusing procedure is repeated a number of times to produce a plurality of layers on the partially formed component to, ultimately, form the metal alloy component.

SUMMARY

Shortcomings of the prior art are overcome and additional advantages are provided through the provision, in one embodiment, of a system for adaptively forming three-dimensional components from a plurality of deposited layers of metallic powder. The system includes a build chamber, a plurality electron beam sources, and a controller. The build chamber includes a housing, a build platform disposed in the build chamber, and an actuator for moving the build platform in the build chamber. The plurality of electron beam sources are operable for directing a plurality of electron beams into the build chamber and onto the plurality of deposited layers of metallic powder disposed on the build platform. The controller is operable for simultaneously controlling the actuator and the plurality of electron beam sources to direct the plurality of electron beams onto the plurality of deposited layers of metallic powder on the build platform to sequentially consolidate patterned portions of the plurality of deposited metallic powder layers to adaptively form the three-dimensional components.

In another embodiment, a method for adaptively forming a three-dimensional component includes providing a plurality of electron beam sources, and simultaneously controlling the plurality of electron beam sources to direct a plurality of electron beams onto a plurality of deposited layers of metallic powder to sequentially consolidate patterned portions of the plurality of deposited metallic powder layers to adaptively form the three-dimensional component.

DRAWINGS

One or more embodiment of the present disclosure are particularly pointed out and distinctly claimed as examples in the claims at the conclusion of the specification. The foregoing and other objects, features, and advantages of the present disclosure are apparent from the following detailed description taken in conjunction with the accompanying drawings in which:

FIG. 1 diagrammatically illustrates an additive manufacturing system employing a plurality of electron beam sources in accordance with an embodiment of the present disclosure;

FIG. 2 diagrammatically illustrates an embodiment of one of the electron beam sources of FIG. 1;

DETAILED DESCRIPTION

Embodiments of the present disclosure and certain features, advantages, and details thereof, are explained more fully below with reference to the non-limiting examples illustrated in the accompanying drawings. Descriptions of well-known materials, processing techniques, etc., are omitted so as not to unnecessarily obscure the disclosure in detail. It should be understood, however, that the detailed description and the specific examples, while indicating embodiments of the present disclosure, are given by way of illustration only, and not by way of limitation. Various substitutions, modifications, additions, and/or arrangements, within the spirit and/or scope of the underlying inventive concepts will be apparent to those skilled in the art from this disclosure.

Figure 1:
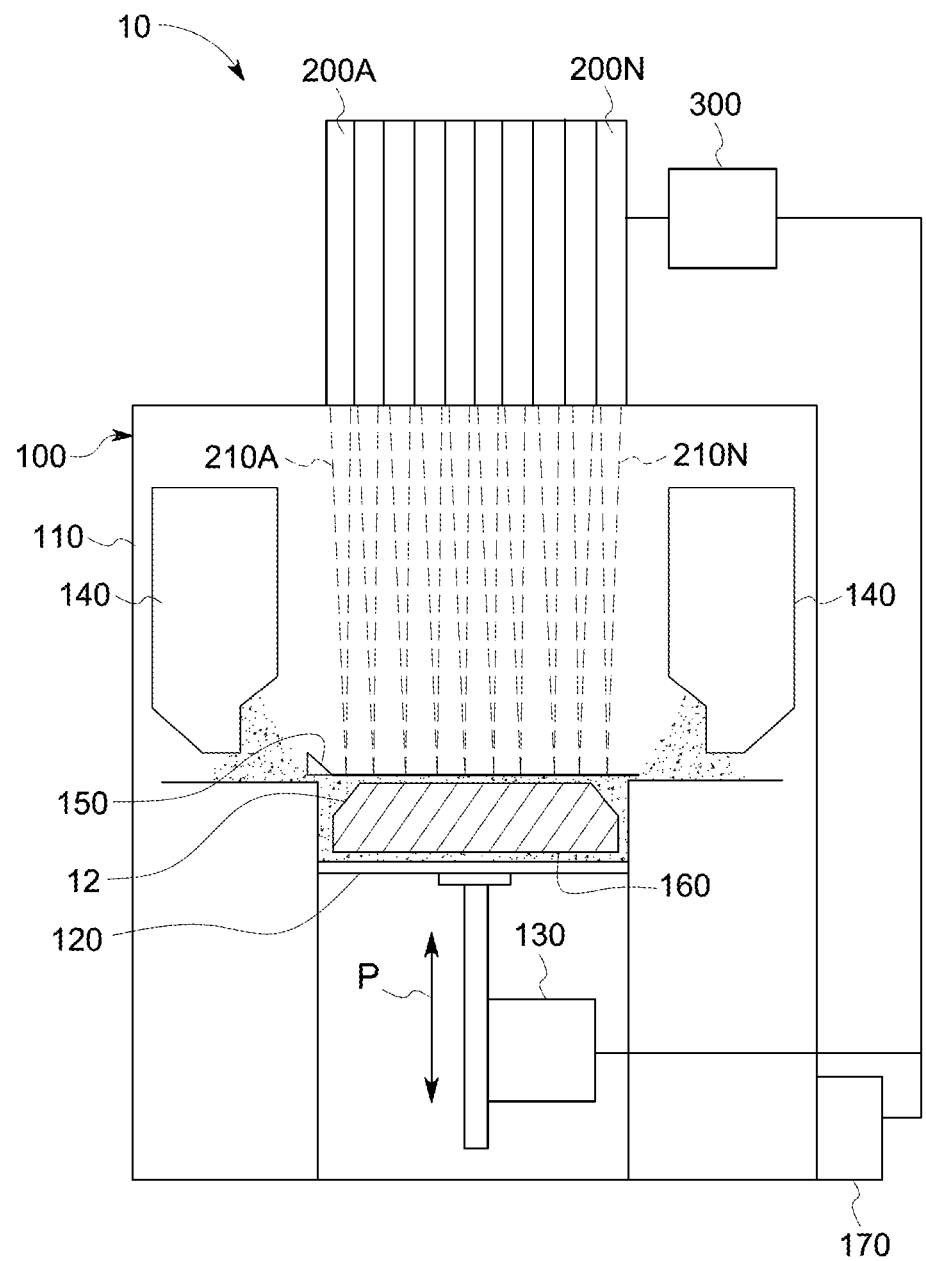

FIG. 1 diagrammatically illustrates a system 10 in accordance with an embodiment of the present disclosure for adaptively forming three-dimensional components from a plurality of deposited layers of metallic powder. System 10 generally includes a build chamber 100, a plurality of electron beam sources 200A through 200N, and a controller 300. Build chamber 100 may include a housing 110 defining a vacuum chamber, a build platform 120 disposed in the build chamber, an actuator 130 for moving the build platform in the build chamber, one or more powder hoppers 140, and a powder distributor 150. Plurality of electron beam sources 200 may include a plurality of electron beam guns or sources (one of which being shown in FIG. 2) for directing a plurality of electron beams 210A through 210N into the build chamber and onto a plurality of deposited layers of metallic powder disposed on the build platform.

While FIG. 1 illustrates a linear row of a plurality of electron beams, it is appreciated that electron beam source 300 may include a plurality of adjacent linear rows of plurality of electron beams operable to define a two-dimensional array of emitted election beams. Controller 300 is operable for simultaneously controlling actuator 130 and the plurality of electron beam sources to direct the plurality of electron beams onto a plurality of deposited layers of metallic powder on the build platform to sequentially consolidate patterned portions of the plurality of deposited metallic powder layers to adaptively form three-dimensional component 12.

As will be appreciated from the present description below, the technique of the present disclosure may improve build speed and decrease planar damage thereby enabling the application of additive manufacturing to additional materials and geometries. For example, a linear or two-dimensional array of electron beam guns or sources may serve a portion of the powder bed, leveraging electrostatic focusing, current modulation, and deflection to heat a patterned layer of the powder bed for solidification. Additive manufacturing systems, in one or more embodiments, may include about 10 by about 10 electron beam sources with each electron beam source serving a region of about 25 millimeters (about 1 inch) by about 25 millimeters (about 1 inch) of the powder bed leveraging electrostatic focusing, current modulation, and deflection to heat a sub-millimeter patterned region or layer of the powder bed for solidification. Additionally, the technique of the present disclosure may improve or reduce the processing time of a single layer and in the part build times for forming three-dimensional components, and may be limited due to the powder spreading time required. As will be appreciated, the present technique may overcome the problems associated with a single electron beam additive system that cannot maintain mechanical integrity across a large area.

With reference still to FIG. 1, powder hoppers 140 may hold powder material which is provided on a start plate 160. The powder material may be pure metals or metal alloys such as titanium, titanium alloys, aluminum, aluminum alloys, stainless steel, Co—Cr—W alloy, etc. A first powder layer may be provided by distributing powder evenly over the start plate or a solidified patterned layer. For example, material deposited from hoppers 140 may be distributed by powder distributor 150 such as a rake system. The rake may be moved to distribute the powder over the start plate or a solidified patterned layer. The distance between a lower part of the rake and the upper part of the start plate or solidified patterned layer may determine a thickness of distributed powder layer. The powder layer thickness may be easily be adjusted by adjusting the height of the build platform via the actuator.

At least a portion of the plurality of electron beam guns or sources may be provided in or in fluid communication with a vacuum in the build chamber 100. Build chamber 100 may be operable for maintaining a vacuum environment by means of a vacuum system 170, which vacuum system may comprise a turbo-molecular pump, a scroll pump, an ion pump, and one or more valves which are well known to a skilled person in the art. Vacuum system 170 may be controlled by controller 300.

Three-dimensional component 12 may be formed through successive fusion of parts of a powder bed, which component corresponds to successive cross-sections of the three-dimensional component, and include a step of providing a model of the three dimensional component. The model may be generated via a CAD (Computer Aided Design) tool.

Figure 2:
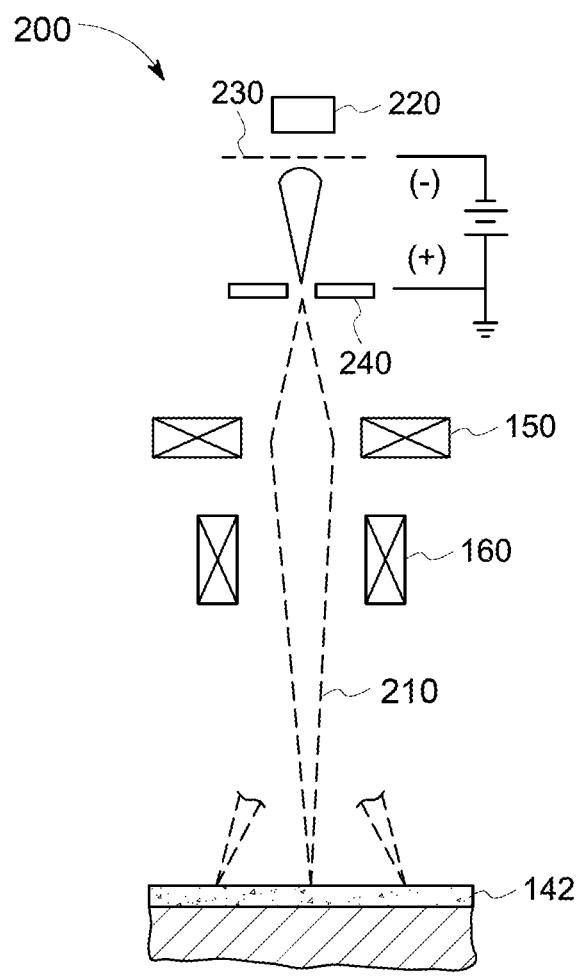

FIG. 2 illustrates one embodiment of electron beam gun or source 200 for producing electron beam 210. For example, the electron beam gun or source may generally include a cathode 220, a grid 230, and an anode 240, which is used to generate and accelerate a primary electron beam. A magnetic focusing coil 150 and deflection coil 160 may be used for controlling the way in which the electron beam impinges on the powder layer 142 being processed. In operation, cathode may be a source of thermally-emitted electrons that are both accelerated and shaped into a collimated beam by the electrostatic field geometry established by grid 230 and anode 240. The electron beam then emerges through an exit hole in anode 240 with, for example, an energy equal to the value of the negative high voltage being applied to the cathode. After exiting the anode, the beam passes through electromagnetic focusing coil 150 and deflection coil 160. The focusing coil is used for producing either a focused or defocused beam spot on patterned layer 142, while the deflection coil is used to either position the beam spot on a stationary location or move the spot over a region of the patterned layer 142. It will be appreciated that other types of electron beam guns or sources and/or additional components may be suitably employed.

With reference again to FIG. 1, the plurality of electron beam guns or sources 200A through 200N generates a plurality of electron beams 210A through 210N which is used for melting or fusing together powder material or patterned layer 142 (FIG. 2). During a work cycle or additive build, build platform 120 is lowered successively in relation to the plurality of electron beam sources 200 after each added layer of powder material. For example, build platform 120 may be movable in a vertical direction, i.e., in the direction of double-headed arrow P. Build platform 120 may be disposed in an initial position, in which a first powder material layer of desired thickness has been laid down on start plate 160. The build platform is thereafter lowered in connection with laying down a new powder material layer for the formation of a new cross-section of a three-dimensional component. The actuator or means for lowering the build platform 160 may include a servo motor equipped with a gear, adjusting screws, etc.

Controller 300 may be used for controlling, among other things, the plurality of electron beam sources, the actuator, powder distributor 150, and vacuum pressure in the build chamber. For example, controller 300 may be operable for controlling and managing the position or location of the plurality of electron beams impinging on a patterned layer during the time for heating the power layer. Control unit 300 may include instructions for controlling each electron beam for each layer of the three-dimensional component to be formed.

Figure 3:
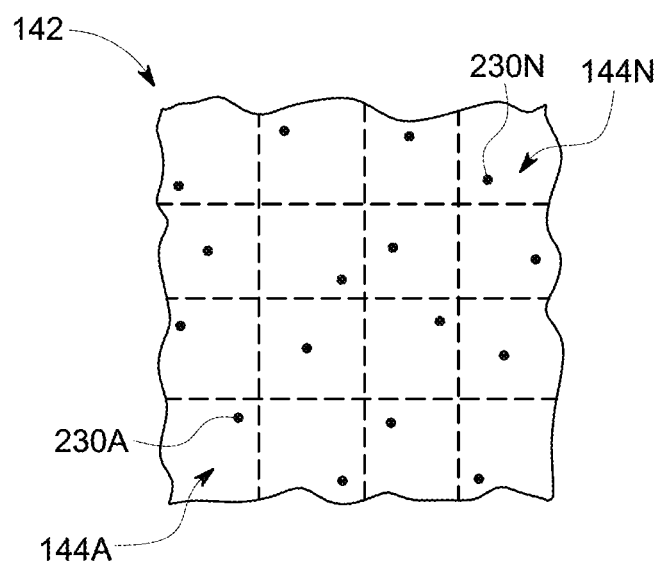
FIG. 3 illustrates a top plan view of a portion of a powder layer for use in forming a three-dimensional component employing the additive manufacturing system of FIG. 1.

FIG. 3 illustrates a top plan view of a portion of powder layer 142 for use in forming a three-dimensional component employing additive manufacturing system 10 FIG. 1). For example, the portion of powder layer 142 is illustrated in broken lines as being divided into a plurality of regions or areas 144A through 144N. Each of the electron beam guns or sources 200A through 200N (FIG. 1) corresponding to a different one of plurality of regions or areas 144A through 144N. In addition, illustrated in each of the regions is an electron beam thermal spot 230A through 230N covering a portion of respective regions 144A through 144N generated by electron beams 210A through 210N at a point in time, t1. At t2 to tN, the electron beam thermal spots may be moved to another locations in the sub-region.

For example, in one or more embodiment, adaptive manufacturing system 10 (FIG. 1) may include a two-dimensional array of electron beam sources which are operable to process a two-dimensional powdered layer having a width of about 250 millimeters (about 10 inches) and a length of about 250 millimeters (about 10 inches). Each electron beam gun or source may be operable to cover a different two-dimensional region having a width of about 25 millimeters (about 1 inch) and a length of about 25 millimeters (1 inch). Each electron beam gun or source may provide a two-dimensional electron beam thermal spot of having a width of about 0.1 millimeter and a length of about 0.1 millimeter. Each two-dimensional region (e.g., about 25 millimeters by about 25 millimeters region) may include about 62,500 sub-regions (e.g., different about 0.1 millimeter by about 0.1 millimeter sub-regions).

It this illustrated embodiment, each patterned power layer may be heated by the plurality of electron beams for about 10 milliseconds (corresponding, for example, to t0 to tN) to operably melt the powdered layer. For example, in this embodiment, each of the 62,500 sub-regions will be exposed to the electron beam having an electro beam power of about 6.4 kW (about 2 J/mm3) for a period of about 160 nanoseconds, e.g., 160 nanoseconds dwell time per sub-region. It will be appreciated that if fewer electron beam guns or sources is provided, power may need to be increased while dwell time may need to be decreased. The targeting deposited energy may be about 2 J/mm3 at a depth is about 50 microns. In addition, the plurality of electron beams may be pulsed electron beams operably provided by switching on and off the generation of the electrons in the electron beam gun or source such as via control by the controller. The frequency of the switching may correspond to and be timed to the different thermal heating spots to be applied to the sub-regions.

With reference again to FIGS. 1-3, a first powder layer may be disposed on the start build 160 (FIG. 1). The plurality of electron beams may be directed over start plate 160 (FIG. 1) causing a first powder layer to fuse in selected locations to form a first cross-section of the three-dimensional component. For example, control unit 300 is operable for directing the location or position the plurality of electron beams engaging the first powder layer. After a first layer is formed, a second powder layer is provided on top of the first solidified layer. After distribution of the second powder layer, the plurality of electron beams is directed onto the second powder layer causing the second powder layer to fuse in selected locations to form a second cross-section of the three-dimensional component. Fused portions in the second layer may be bonded to fused portions of the first layer. The fused portions in the first and second layer may be melted together by melting not only the powder in the uppermost layers but also remelting at least a fraction of a thickness of a layer directly below the uppermost layer.

For example, the application of the plurality of electron beams may result in the electron beams forming a thermal heat spot directed on and which is moved over the corresponding sub-region of the powder layer. The movement of the thermal heat spots may be controlled by the controller based on a predetermined paths or may be randomly moved over the sub-regions. The controller may be configured to optimize a rate of consolidating the patterned portions of the plurality of deposited metallic powder layers to form the three-dimensional component having a single crystal structure. The controller may minimize thermal gradients in consolidating the patterned portions of the plurality of deposited metallic powder layers to form the three-dimensional component having a single crystal structure.

In one or more embodiments of the present disclosure, the electron beam guns or sources may generate a plurality of focusable electron beams with an accelerating voltage of about 60 kV and with a beam power in the range of about 0 kW to about 10 kW, about 2 kW to about 8 kW, about 5 kW to about 7 kW, or about 6.5 kW.

In one or more embodiments, the three-dimensional component may be a turbine component such as a turbine airfoil or blade. In one or more embodiments, the three-dimensional component may be a turbine component repair. For repair of a turbine blade, an array of electron beam sources may include a linear array of 1 by 10 electron beam guns or sources.

Figure 4:
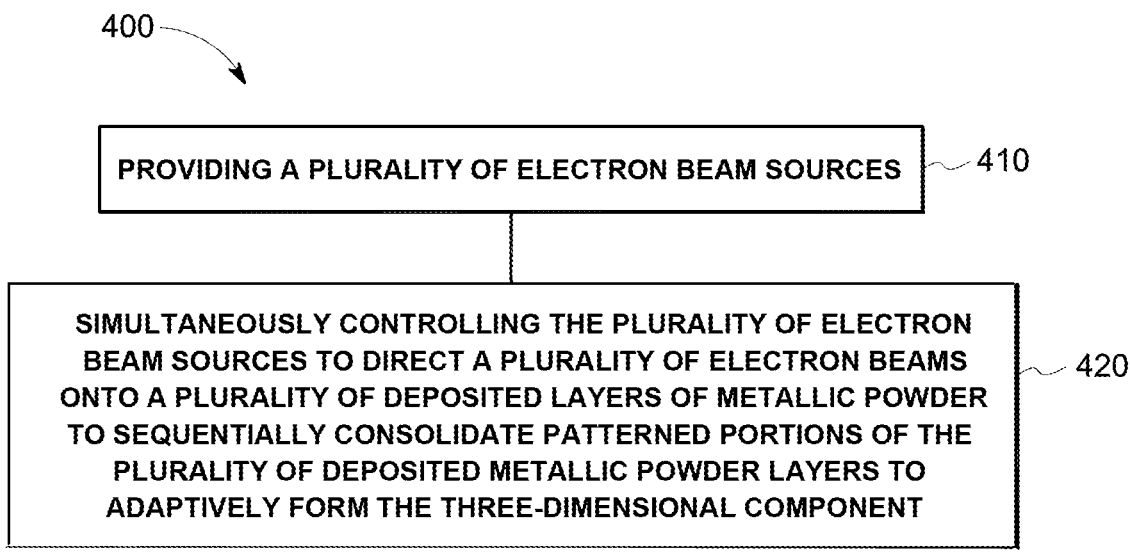
FIG. 4 illustrates a flowchart of a method for adaptively forming a three-dimensional component in accordance with the present disclosure.

FIG. 4 illustrates a flowchart of a method 400 for adaptively forming a three-dimensional component in accordance with the present disclosure. For example, method 400 may include at 410, providing a plurality of electron beam sources, and at 420, simultaneously controlling the plurality of electron beam sources to direct a plurality of electron beams onto a plurality of deposited layers of metallic powder to sequentially consolidate patterned portions of the plurality of deposited metallic powder layers to adaptively form the three-dimensional component.

Figure 5:
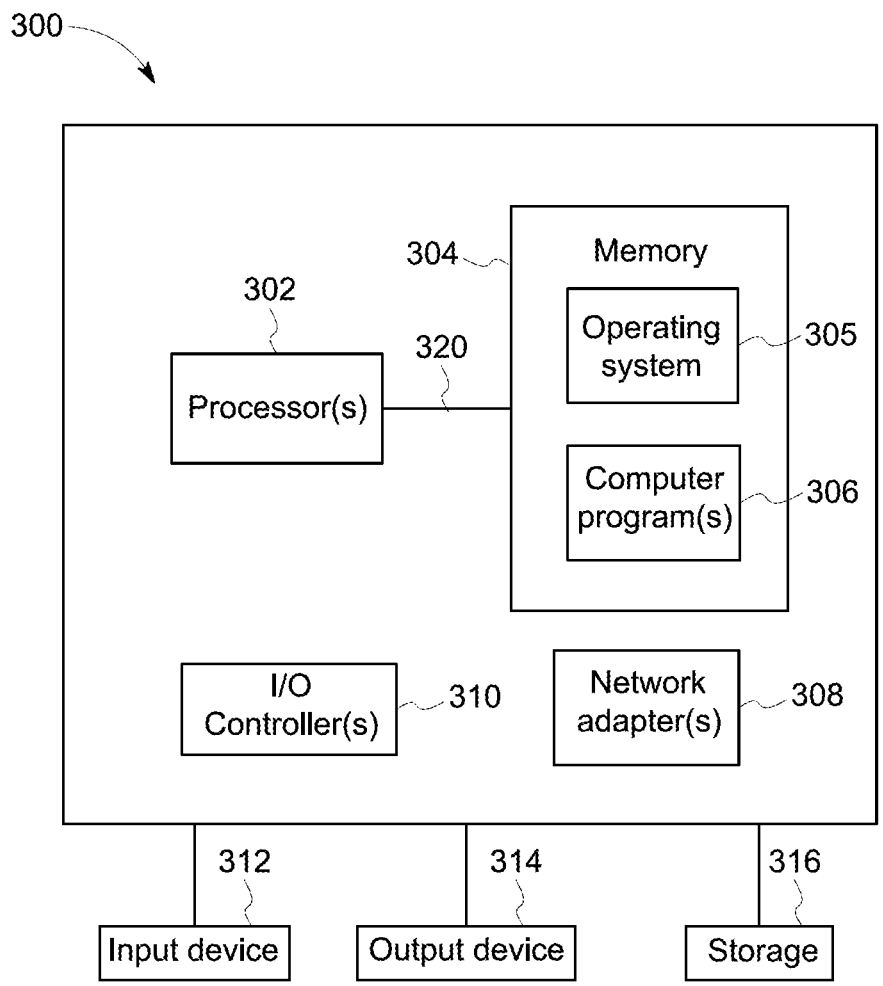
FIG. 5 is a block diagram of a controller in accordance with an embodiment of the present disclosure.

FIG. 5 is a block diagram of controller 300 in accordance with one embodiment of the present disclosure. Controller 300 is suitable for storing and/or executing program code, such as program code for performing the processes described above, and includes at least one processor 302 coupled directly or indirectly to memory 304 through, a bus 320. In operation, processor(s) 302 obtains from memory 304 one or more instructions for execution by the processors. Memory 304 may include local memory employed during actual execution of the program code, bulk storage, and cache memories which provide temporary storage of at least some program code in order to reduce the number of times code must be retrieved from bulk storage during program code execution. A non-limiting list of examples of memory 304 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Memory 304 includes an operating system 305 and one or more computer programs 306, performing the processes described above in connection with the additive manufacturing system.

Input/Output (I/O) devices 312 and 314 (include but not limited to keyboards, displays, pointing devices, etc.) may be coupled to the system either directly or through I/O controllers 310.

Network adapters 308 may also be coupled to the system to enable the data processing system to become coupled to other data processing systems through intervening private or public networks. Modems, cable modem and Ethernet cards are just a few of the currently available types of network adapters 308. In one example, network adapters 308 and/or input devices 312 facilitate obtaining images of a build process in which a three-dimensional component is formed.

Controller 300 may be coupled to storage 316 (e.g., a non-volatile storage area, such as magnetic disk drives, optical disk drives, a tape drive, etc.), having one or more databases. Storage 316 may include an internal storage device or an attached or network accessible storage. Computer programs in storage 316 may be loaded into memory 304 and executed by a processor 302 in a manner known in the art.

Controller 300 may include fewer components than illustrated, additional components not illustrated herein, or some combination of the components illustrated and additional components. Controller 300 may include any computing device known in the art, such as a mainframe, server, personal computer, workstation, laptop, handheld computer, telephony device, network appliance, virtualization device, storage controller, etc. In addition, processes described above may be performed by multiple controllers 300, working as part of a clustered computing environment.

In some embodiments, aspects of the present invention may take the form of a computer program product embodied in one or more computer readable medium(s). The one or more computer readable medium(s) may have embodied thereon computer readable program code. Various computer readable medium(s) or combinations thereof may be utilized. For instance, the computer readable medium(s) may comprise a computer readable storage medium, examples of which include (but are not limited to) one or more electronic, magnetic, optical, or semiconductor systems, apparatuses, or devices, or any suitable combination of the foregoing. Example computer readable storage medium(s) include, for instance: an electrical connection having one or more wires, a portable computer diskette, a hard disk or mass-storage device, a random access memory (RAM), read-only memory (ROM), and/or erasable-programmable read-only memory such as EPROM or Flash memory, an optical fiber, a portable compact disc read-only memory (CD-ROM), an optical storage device, a magnetic storage device (including a tape device), or any suitable combination of the above. A computer readable storage medium is defined to comprise a tangible medium that can contain or store program code for use by or in connection with an instruction execution system, apparatus, or device, such as a processor. The program code stored in/on the computer readable medium therefore produces an article of manufacture (such as a "computer program product") including program code.

It is to be understood that the above description is intended to be illustrative, and not restrictive. Numerous changes and modifications may be made herein by one of ordinary skill in the art without departing from the general spirit and scope of the disclosure as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably" in conjunction with terms such as coupled, connected, joined, sealed or the like is used herein to refer to both connections resulting from separate, distinct components being directly or indirectly coupled and components being integrally formed (i.e., one-piece, integral or monolithic). Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

This written description uses examples, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method for adaptively forming a three-dimensional component, the method comprising:
   simultaneously controlling a plurality of electron beam sources to direct a plurality of electron beams onto a plurality of deposited metallic powder layers to sequentially consolidate patterned portions of the plurality of deposited metallic powder layers to adaptively form the three-dimensional component having a single crystal structure, wherein controlling comprises directing each of the plurality of electron beams onto a different region of the plurality of deposited metallic powder layers, focusing each of the plurality of electron beams onto a portion of each of the different regions, and moving the focused electron beams within the different regions and moving comprises randomly moving the focused electron beams within the different regions.

2. The method of claim 1, further comprising controlling thermal gradients in consolidating the patterned portions of the plurality of deposited metallic powder layers to form the three-dimensional component having a single crystal structure.

3. The method of claim 1, wherein controlling comprises applying the plurality of electron beams for less than about 100 milliseconds per deposited metallic powder layer.

4. The method of claim 1, wherein controlling comprises directing each of the plurality of electron beams onto a different region of about 25 millimeters by 25 millimeters of the plurality of deposited metallic powder layers, focusing each of the plurality of electron beams onto a portion about 0.1 millimeter by about 0.1 millimeters of each of the different regions, and moving the focused electron beams within the different regions for less than about 100 milliseconds per deposited metallic powder layer.

5. The method of claim 1, wherein controlling comprises electrostatically focusing and/or magnetically focusing the plurality of electron beams.

6. The method of claim 1, wherein each of the plurality of electron beam sources is configured to provide an electron beam of up to about 5 kW.

7. The method of claim 1, wherein the three-dimensional component comprises a turbine component or a turbine component repair.

8. The method of claim 1, wherein said plurality of electron beam sources comprises an array of 10 electron beam sources by 10 electron beam sources.

9. The method of claim 1, wherein the metallic powder comprises titanium, titanium alloy, aluminum, aluminum alloy, stainless steel, or Co—Cr—W alloy.

10. The method of claim 1, further comprising controlling a thickness of the plurality of deposited metallic powder layers.

11. The method of claim 1, wherein each electron beam source is configured to provide a two-dimensional electron beam thermal spot having a width of about 0.1 mm and a length of about 0.1 mm.

12. The method of claim 1, wherein the plurality of deposited metallic powder layers are provided in a build chamber, and the method further comprises forming a vacuum in the build chamber.

13. The method of claim 12, wherein at least a portion of the plurality of electron beam sources are in or in fluid communication with the build chamber.

14. The method of claim 1, wherein each of the plurality of electron beam sources is operable to provide an electron beam with an accelerating voltage of about 60 kV and a power in a range up to about 10 kW.

15. The method of claim 1, wherein each of the plurality of electron beam sources is configured to provide an electron beam with a power of about 2 kW to about 8 kW.

16. The method of claim 1, wherein each of the plurality of electron beam sources is configured to provide an electron beam with a power of about 5 kW to about 7 kW.

17. The method of claim 1, wherein each of the plurality of electron beam sources is configured to provide an electron beam with a power of about 6.4 kW.

18. The method of claim 1, wherein the plurality of electron beam sources are fixed relative to the plurality of deposited layers, and the controlling comprises independently directing each of the plurality of electron beams onto the plurality of deposited layers of metallic powder.

* * * * *